US007851931B2

(12) United States Patent
Yamamoto et al.

(10) Patent No.: US 7,851,931 B2
(45) Date of Patent: Dec. 14, 2010

(54) SOUNDPROOF TYPE ENGINE GENERATOR

(75) Inventors: Masanobu Yamamoto, Kakegawa (JP); Shinichi Kajiya, Kakegawa (JP)

(73) Assignee: Yamaha Motor Power Products Kabushiki Kaisha, Shizuoka (JP)

( * ) Notice: Subject to any disclaimer, the term of this patent is extended or adjusted under 35 U.S.C. 154(b) by 289 days.

(21) Appl. No.: 11/775,838

(22) Filed: Jul. 10, 2007

(65) Prior Publication Data

US 2008/0238107 A1 Oct. 2, 2008

(30) Foreign Application Priority Data

Apr. 2, 2007 (JP) ............................ 2007-096684

(51) Int. Cl.
*F02B 63/04* (2006.01)
*H02K 7/18* (2006.01)
*F03G 7/08* (2006.01)

(52) U.S. Cl. ...................................... 290/1 A; 290/1 R

(58) Field of Classification Search ................ 290/1 A, 290/1 R
See application file for complete search history.

(56) References Cited

U.S. PATENT DOCUMENTS 4,608,946 A * 9/1986 Tanaka et al. .................. 123/2
4,647,835 A * 3/1987 Fujikawa et al. ............... 322/1
4,702,201 A * 10/1987 Odo et al. ...................... 123/2
4,721,070 A * 1/1988 Tanaka et al. .................. 123/2
4,759,560 A * 7/1988 Virgulti ................... 280/47.26
4,827,147 A * 5/1989 Mizushima ................. 290/1 A
4,859,886 A * 8/1989 Tanaka et al. ................. 310/51
5,072,956 A * 12/1991 Tannehill et al. ....... 280/33.992
5,121,715 A * 6/1992 Nogami et al. ............. 123/41.7
5,516,175 A * 5/1996 Christensen ................ 294/137
5,575,349 A * 11/1996 Ikeda et al. ................ 180/68.1
5,642,702 A * 7/1997 Kouchi et al. ............ 123/198 E
5,731,687 A * 3/1998 Hirano et al. .................. 322/1
5,924,393 A * 7/1999 Kikuchi ......................... 123/2
6,091,160 A * 7/2000 Kouchi et al. ............... 290/1 A
D455,398 S * 4/2002 Frank et al. ................ D13/110
6,489,690 B1 * 12/2002 Hatsugai et al. ............. 290/1 A
6,492,740 B2 * 12/2002 Suzuki ....................... 290/1 A
D478,043 S * 8/2003 Iwatate et al. .............. D13/116

(Continued)

FOREIGN PATENT DOCUMENTS

JP 09-013983 A 1/1997

(Continued)

OTHER PUBLICATIONS

U.S. Appl. No. 11/775,825, filed Jul 10, 2007, Yamamoto, et al.

*Primary Examiner*—T C Patel
*Assistant Examiner*—Pedro J Cuevas
(74) *Attorney, Agent, or Firm*—Keating & Bennett, LLP

(57) ABSTRACT

A soundproof type engine generator has an outer shell made by attaching at least a bottom panel to a three-dimensional frame and four wheels in the lower part thereof for transport. The soundproof type engine generator also has handles provided coaxially with opposing wheel shafts of the four wheels, which can be held by a user and facilitate the lifting of the soundproof type engine generator, even if the engine generator is heavy. The wheels of the engine generator are disposed farther outward than the outer shell of the soundproof type engine generator.

12 Claims, 18 Drawing Sheets

U.S. PATENT DOCUMENTS

| | | | | |
|---|---|---|---|---|
| 6,629,517 | B2 * | 10/2003 | Honda | 123/196 R |
| 6,637,399 | B2 * | 10/2003 | Sato et al. | 123/196 R |
| 6,753,620 | B2 * | 6/2004 | Fukuda | 290/1 A |
| 6,784,560 | B2 * | 8/2004 | Sugimoto et al. | 290/1 R |
| 6,792,897 | B2 * | 9/2004 | Higuchi et al. | 123/2 |
| 6,917,121 | B2 * | 7/2005 | Akimoto et al. | 290/1 A |
| 6,975,042 | B2 * | 12/2005 | Yamada et al. | 290/1 R |
| 6,979,912 | B2 * | 12/2005 | Mazuka et al. | 290/1 A |
| D518,771 | S * | 4/2006 | Xiao | D13/116 |
| 7,023,101 | B2 * | 4/2006 | Wang | 290/1 A |
| D520,948 | S * | 5/2006 | Xiao | D13/116 |
| D521,929 | S * | 5/2006 | Xiao | D13/116 |
| D547,718 | S * | 7/2007 | Helgeson et al. | D13/116 |
| 7,252,063 | B2 * | 8/2007 | Mazuka et al. | 123/179.18 |
| 7,309,927 | B2 * | 12/2007 | Sugiyama et al. | 290/1 A |
| D567,175 | S * | 4/2008 | Knuteson et al. | D13/112 |
| D572,658 | S * | 7/2008 | Yamamoto et al. | D13/116 |
| 7,432,606 | B2 * | 10/2008 | Yamamoto et al. | 290/1 R |
| 7,471,000 | B1 * | 12/2008 | Ruiz | 290/1 A |
| 7,557,458 | B2 * | 7/2009 | Yamamoto et al. | 290/55 |
| 7,673,589 | B2 * | 3/2010 | Shimada et al. | 123/2 |
| 2002/0117145 | A1 * | 8/2002 | Honda | 123/196 R |
| 2002/0121260 | A1 * | 9/2002 | Sato et al. | 123/196 R |
| 2003/0070651 | A1 * | 4/2003 | Higuchi et al. | 123/300 |
| 2003/0071465 | A1 * | 4/2003 | Sugimoto et al. | 290/1 R |
| 2003/0075926 | A1 * | 4/2003 | Fukuda | 290/1 A |
| 2006/0145550 | A1 * | 7/2006 | Yamamoto et al. | 310/89 |
| 2006/0169238 | A1 * | 8/2006 | Mazuka et al. | 123/179.18 |
| 2006/0214425 | A1 * | 9/2006 | Yamamoto et al. | 290/1 A |
| 2007/0108767 | A1 * | 5/2007 | Hirose et al. | 290/1 A |
| 2008/0128032 | A1 * | 6/2008 | Lapetina et al. | 137/334 |
| 2008/0202447 | A1 * | 8/2008 | Kochi et al. | 123/2 |
| 2008/0202480 | A1 * | 8/2008 | Yamamoto et al. | 123/519 |
| 2008/0231144 | A1 * | 9/2008 | Grant et al. | 310/339 |
| 2008/0238221 | A1 * | 10/2008 | Yamamoto et al. | 310/51 |
| 2008/0265844 | A1 * | 10/2008 | Smith et al. | 322/1 |
| 2009/0045684 | A1 * | 2/2009 | Ma | 310/50 |
| 2009/0320772 | A1 * | 12/2009 | Hirose et al. | 123/41.31 |
| 2009/0320773 | A1 * | 12/2009 | Kobayashi et al. | 123/41.31 |
| 2009/0322046 | A1 * | 12/2009 | Hirose et al. | 280/47.371 |
| 2009/0322097 | A1 * | 12/2009 | Hirose et al. | 290/1 A |
| 2009/0322100 | A1 * | 12/2009 | Hiranuma et al. | 290/1 R |

FOREIGN PATENT DOCUMENTS

| | | | |
|---|---|---|---|
| JP | 2002295265 | A * | 10/2002 |
| JP | 2006161692 | A * | 6/2006 |
| JP | 2006170036 | A * | 6/2006 |
| JP | 2006-188980 | | 7/2006 |
| JP | 2006-188982 | | 7/2006 |
| JP | 2008255829 | A * | 10/2008 |
| JP | 2008255831 | A * | 10/2008 |
| WO | WO 2005026606 | A1 * | 3/2005 |

* cited by examiner (a)

(b)

SOUNDPROOF TYPE ENGINE GENERATOR

CROSS-REFERENCE TO RELATED APPLICATIONS

The present application is based on and claims priority under 35 U.S.C. §119 to Japanese Patent Application No. 2007-096684, filed on Apr. 2, 2007, the entire contents of which are expressly incorporated by reference herein.

BACKGROUND OF THE INVENTION

1. Field of the Invention

This invention relates to a portable, soundproof type engine generator.

2. Description of the Related Art

Conventional soundproof type engine generators have an outer shell made by attaching panels to a three-dimensional frame and four wheels in the lower part for transport (Refer to, for example, Japanese Publication No. 2006-188982). Such a soundproof type engine generator is provided with areas on the underside of the bottom panel to be held by hand by a user. These grip areas are constituted with recesses or projections formed integrally with the bottom panel.

According to JP 2006-188982, as the grip areas are constituted with recesses or projections formed by raising or sinking a surface integrally with the bottom panel to put hands on, it is hard to apply sufficient force by hand thereto, in particular when the soundproof type of engine generator is of a large size, and so it is hard to lift the engine generator to a high position.

SUMMARY OF THE INVENTION

In view of the circumstances noted above, an aspect of at least one of the embodiments disclosed herein is to provide a soundproof generator that makes it easy to lift the soundproof generator to a high position even if the soundproof generator is heavy.

In accordance with one aspect of the present invention, a soundproof type engine generator having an outer shell made by attaching at least a bottom panel to a three-dimensional frame and four wheels in the lower part for transport is provided. The soundproof type engine generator comprises a handle provided coaxially with a wheel shaft between two of the four wheels, the handle configured to be held by hand.

In accordance with another aspect of the present invention, a soundproof type engine generator having an outer shell and a plurality of wheels on a lower portion of the shell for transporting the engine generator is provided. The soundproof type engine generator comprises a handle extending between two wheels on opposite sides of the engine generator, the handle configured to facilitate lifting of the soundproof type engine generator

BRIEF DESCRIPTION OF THE DRAWINGS

These and other features, aspects and advantages of the present inventions will now be described in connection with preferred embodiments, in reference to the accompanying drawings. The illustrated embodiments, however, are merely examples and are not intended to limit the inventions. The drawings include the following 18 figures.

DETAILED DESCRIPTION OF THE PREFERRED EMBODIMENTS

FIGS. 1 to 12 show external shape and constitution of the soundproof type of engine generator 10 of the invention.

Figure 9:
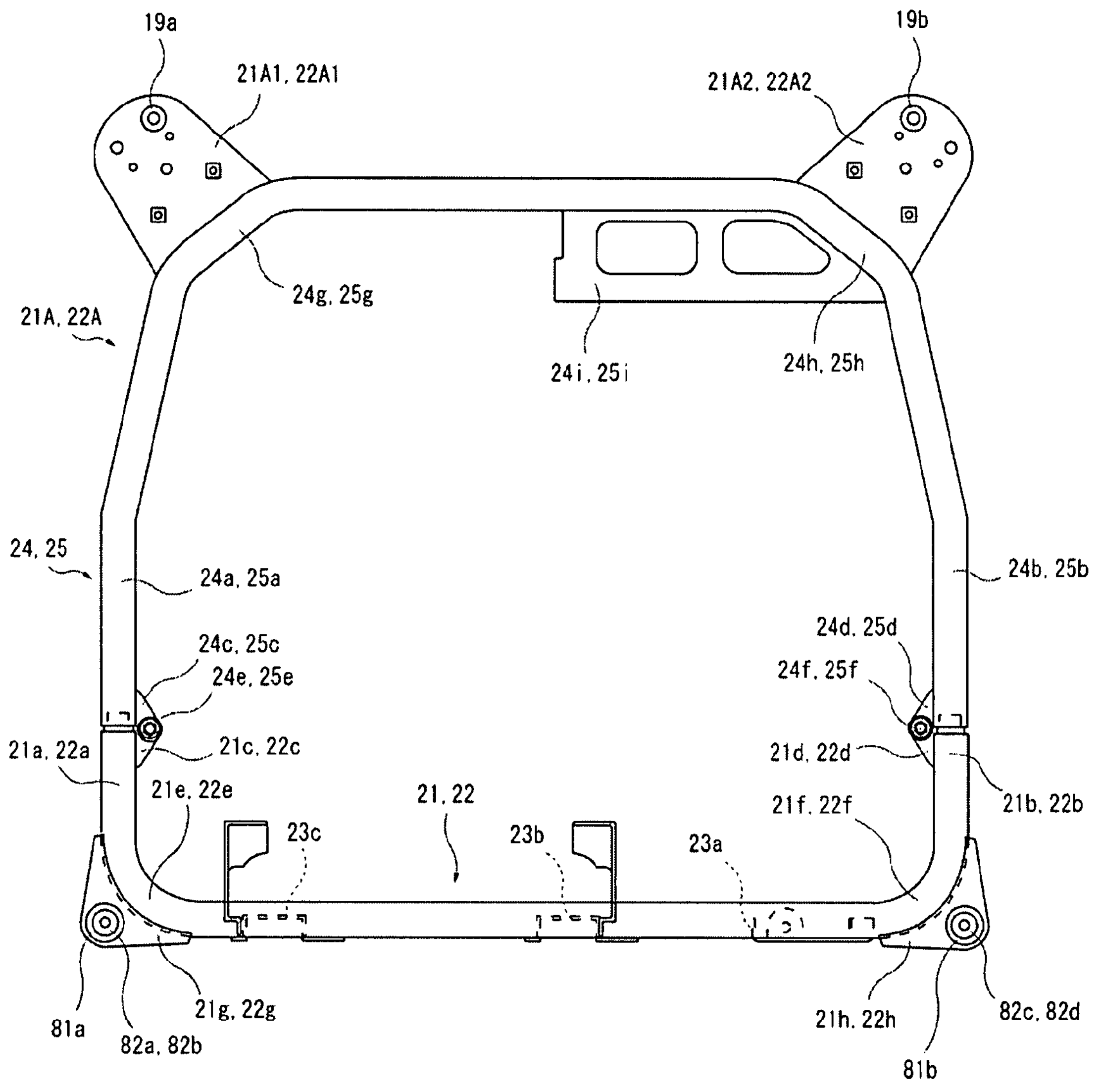
FIG. 9 is a schematic front elevation showing a front frame and a rear frame of an embodiment of a soundproof type engine generator.

The soundproof type engine generator 10 can have an outer shell constituted with a soundproof case K in a slightly rounded, quasi-box shape. A front frame 21A and a rear frame 22A, which can be made of metallic pipe, can be disposed at the front and rear of the case, set apart by a specified distance from each other. The front frame 21A and the rear frame 22A are respectively covered with a front cover 11 and a rear cover 12, which can be made of plastic. As shown in FIG. 9, when a virtual plane parallel to the drawing surface is assumed between the front frame 21A and the rear frame 22A, both the frames are symmetrical on front and rear sides of the virtual plane. Both ends 21*a*, 21*b* of the front lower frame 21 are bent to extend upward. Both ends 24*a*, 24*b* of the front support frame 24 are bent to extend downward. Both ends 24*a*, 24*b* are inserted into and connected to both ends 21*a*, 21*b*. Attachment brackets 21*c*, 21*d* weld-secured inside both ends 21*a*, 21*b* and attachment brackets 24*c*, 24*d* weld-secured inside both ends 24*a*, 24*b* are overlapped together and secured by tightening joining bolts 24*e*, 24*f*. Both ends 22*a*, 22*b* of the rear lower frame 22 are bent to extend upward. Both ends 25*a*, 25*b* of the rear support frame 25 are bent to extend downward.

Both ends 25*a*, 25*b* are inserted into and connected to both ends 22*a*, 22*b*. Attachment brackets 22*c*, 22*d* weld-secured inside both ends 22*a*, 22*b* and attachment brackets 25*c*, 25*d* weld-secured inside both ends 25*a*, 25*b* are overlapped together and secured by tightening joining bolts 25*e*, 25*f*.

Handle attachment brackets 21A1, 22A1 and handle attachment brackets 21A2, 22A2 are weld-secured to curved parts 24*g*, 25*g* on the left side and curved parts 24*h*, 25*h* on the right side of the front support frame 24 and the rear support frame 25. Both ends of the handle 19*a* are attached to the handle attachment brackets 21A1, 22A1. Both ends of the handle 19*b* are attached to the handle attachment brackets 21A2, 22A2. Fuel tank attachment plates 24*i*, 25*i* can be weld-secured to corresponding right positions of the front support frame 24 and the rear support frame 25.

The front lower frame 21 and the rear lower frame 22 are interconnected through connecting frames 23*a*, 23*b*, 23*c*. Wheel shaft attachment brackets 21*g*, 22*g* and 21*h*, 22*h* can be respectively weld-secured to outer sides of bent parts 21*e*, 22*e* and bent parts 21*f*, 22*f* of the front lower frame 21 and the rear lower frame 22. The wheel shaft attachment brackets 21*g*, 22*g* and 21*h*, 22*h* can be respectively made of triangular metallic plate. Wheel shafts 82*a*, 82*b* weld-secured to both ends of a pipe 81*a* can be weld-secured to the wheel shaft attachment brackets 21*g*, 22*g*. Wheel shafts 82*c*, 82*d* weld-secured to both ends of a pipe 81*b* can be weld-secured to the wheel shaft attachment brackets 21*h*, 22*h*. In this way, the front frame 21 and the rear frame 22A are interconnected in their upper positions through handles 19*a*, 19*b*, which can be iron-made, and in lower positions through pipes 81*a*, 81*b*, which can be iron-made. A front panel 13 is placed on the front cover 11 while a rear panel 17 is placed on the rear cover 12. Between the respectively placed front cover 11 and rear cover 12 are placed a top cover 14, a right side cover 15, a left side cover 16, and a bottom cover 18. The front panel 13, the rear panel 17, the top cover 14, the left side cover 16, and the bottom cover 18 can be respectively made of plastic.

The front cover 11 and rear cover 12 are made in the same shape, and their main parts 11*a*, 12*a* are made in approximately square frame shape with upper two corners rounded. A pair of lugs 11*b*, 11*c* rising up are formed at the upper two corners of the cover main part 11*a*. A pair of lugs 12*b*, 12*c* rising up are formed at the upper two corners of the cover main part 12*a*. Two pairs of lugs 11*b*, 12*b* and lugs 11*c*, 12*c* cover the handle attachment brackets 21A1, 22A1 of the front frame 21A, and the handle attachment brackets 21A2, 22A2 of the rear frame 22A. The soundproof type of engine generator 10 is portable by gripping the handle 19*a* attached to the handle attachment brackets 21A1, 22A1, and the handle 19*b* attached to the handle attachment brackets 21A2, 22A2.

Both sides of the cover main part 11*a* can be formed to gradually widen downward, so that its lower corners 11*d*, 11*e* are located sidewise wider than the pair of lugs 11*b*, 11*c* respectively located above the lower corners. Likewise, both sides of the cover main part 12*a* can be formed to gradually widen downward, so that its lower corners 12*d*, 12*e* are located sidewise wider than the pair of lugs 12*b*, 12*c* respectively located above the lower corners. To the lower corners 11*d*, 11*e* are respectively attached wheel covers 80*a*, 80*c*. Likewise, to the lower corners 12*d*, 12*e* are respectively attached wheel covers 80*b*, 80*d*.

To the positions of opposing wheel cover 80*a* and wheel cover 80*b* are attached wheel shafts 82*a*, 82*b* provided at both ends of the pipe 81*a*. Wheels 83*a*, 83*b* can be attached with bolts 84*a*, 84*b* to the wheel shafts 82*a*, 82*b*, so that the wheels 83*a*, 83*b* are rotatable on the wheel shafts 82*a*, 82*b*. Likewise, to the positions of opposing wheel cover 80*c* and wheel cover 80*d* are attached wheel shafts 82*c*, 82*d* provided at both ends of the pipe 81*b*. Wheels 83*c*, 83*d* can be attached with bolts 84*c*, 84*d* to the wheel shafts 82*c*, 82*d*, so that the wheels 83*c*, 83*d* are rotatable on the wheel shafts 82*c*, 82*d*.

A stop cover 85*a* is attached between the wheel cover 80*b* and the outer side of the wheel shaft 82*b* with a bolt 85*b* and a bolt 84*b*. A stop lever 85*c* is rotatably attached to the stop cover 85*a*. Rotation of the wheel 83*b* may be stopped by turning the stop lever 85*c* and pressing it against the wheel 83*b* to make the soundproof type engine generator 10 immovable.

Figure 1:
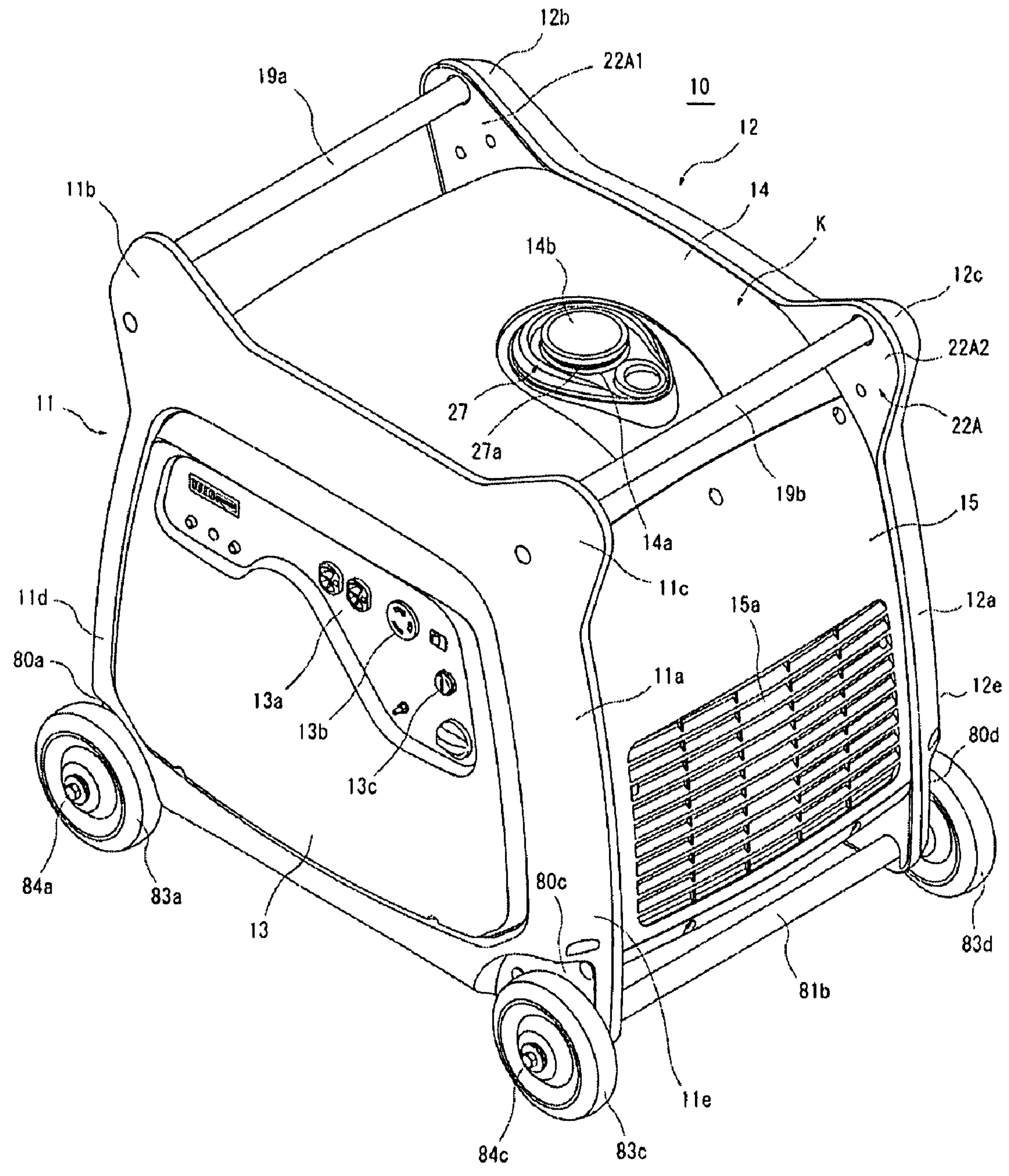
FIG. 1 is a schematic oblique view as seen from the front side of a soundproof type engine generator, in accordance with one embodiment.
Figure 2:
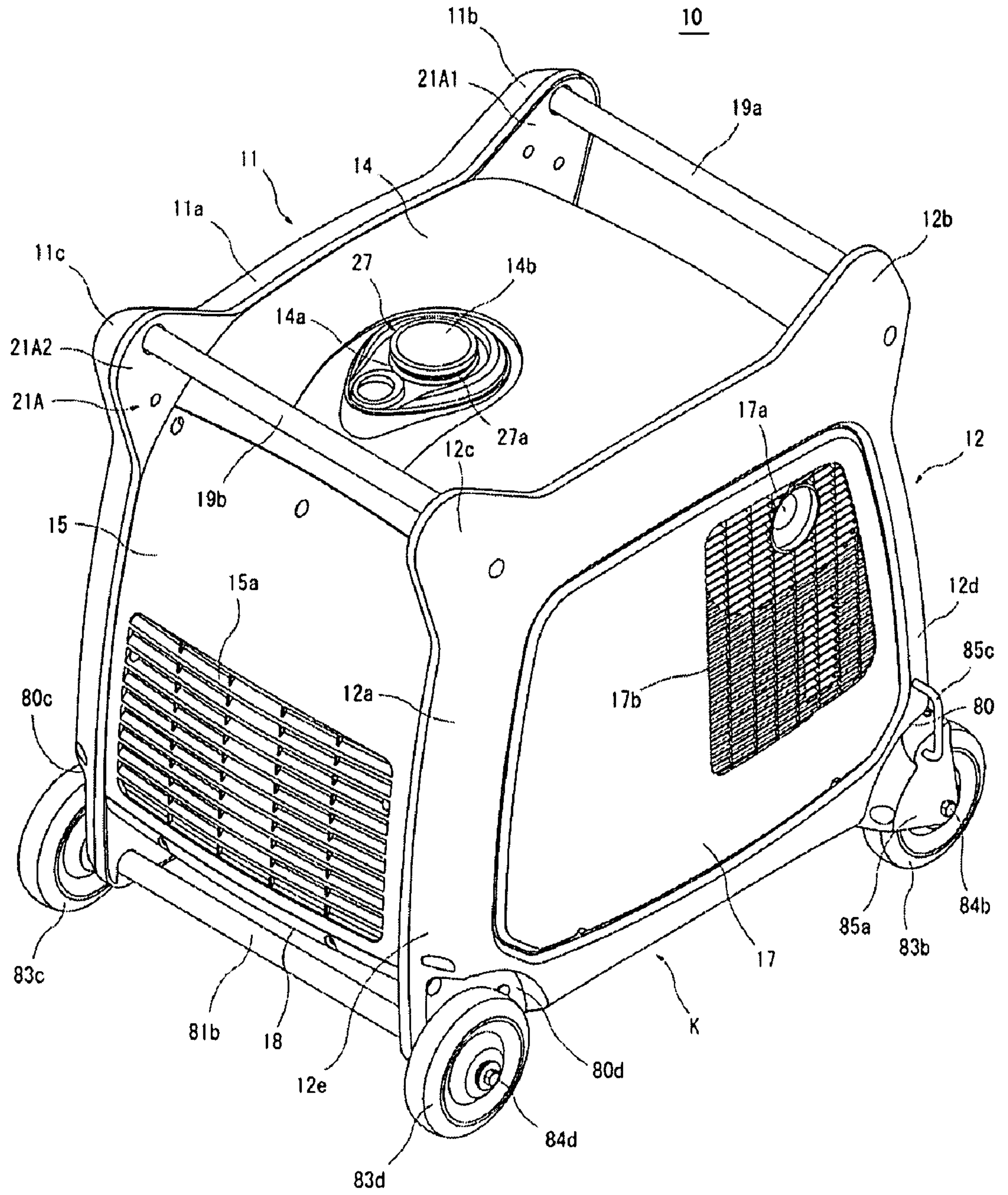
FIG. 2 is a schematic oblique view as seen from the rear side of the soundproof type of engine generator.
Figure 3:
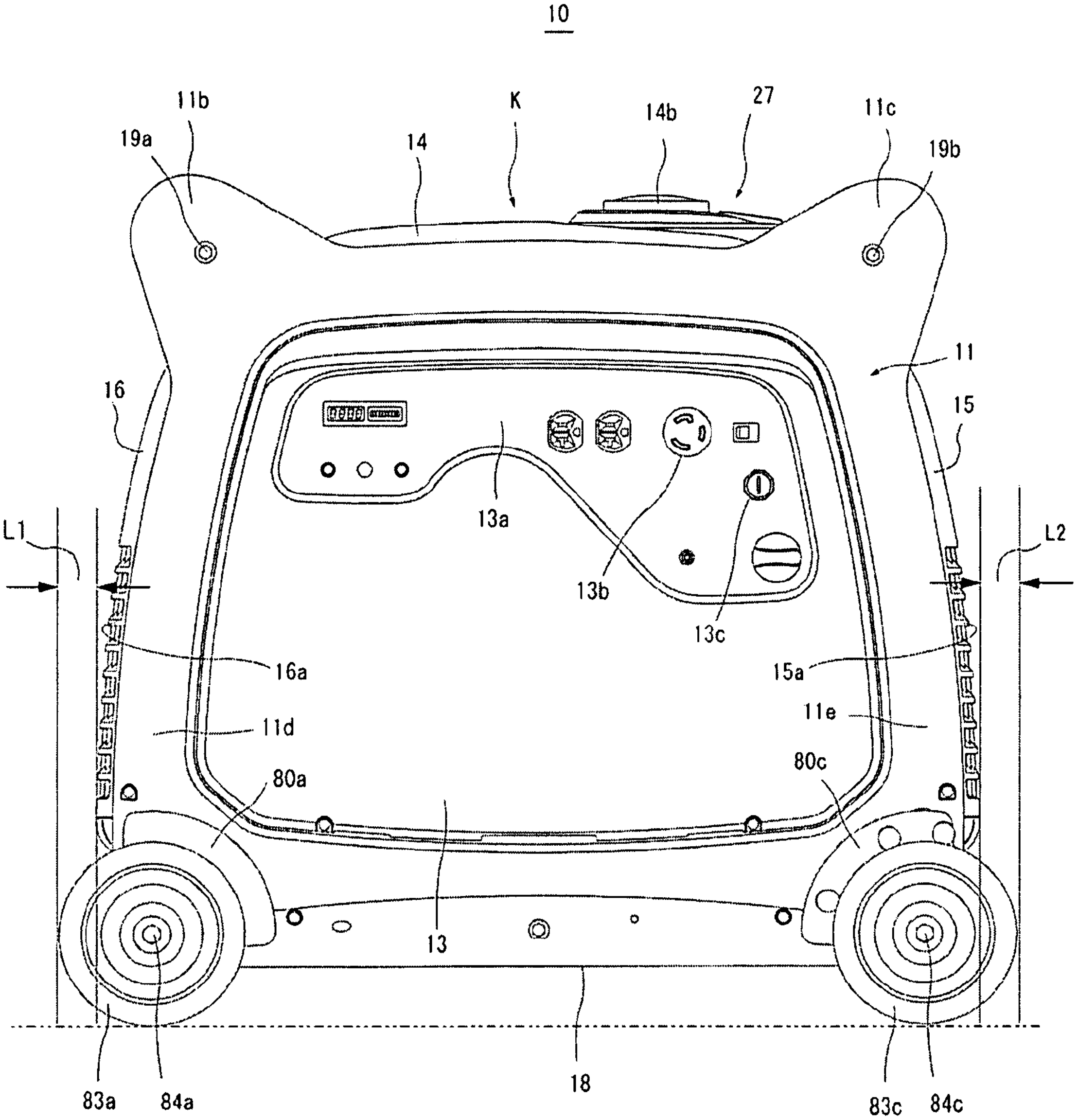
FIG. 3 is a schematic front elevation view of the soundproof type engine generator.
Figure 4:
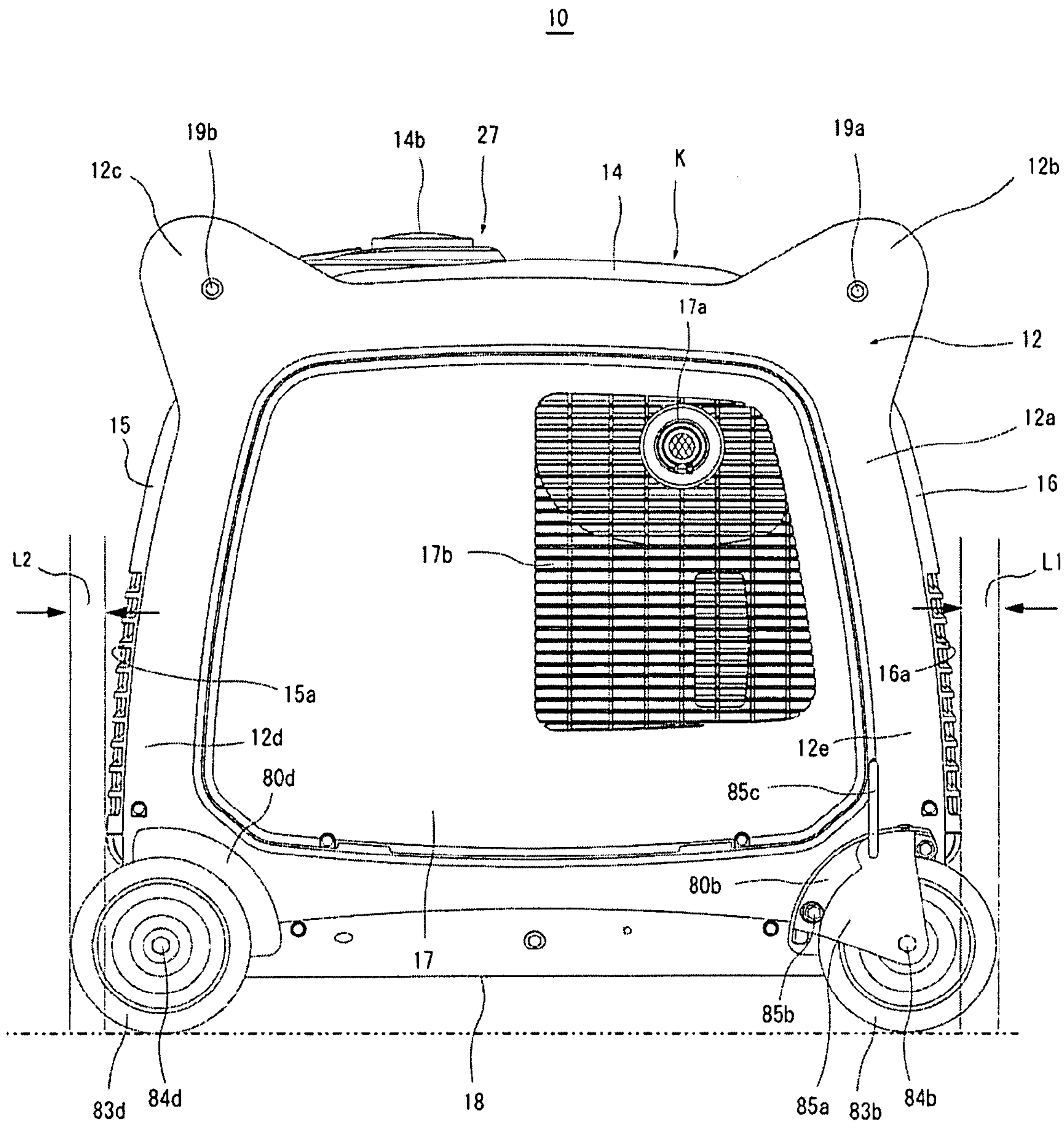
FIG. 4 is a schematic rear view of the soundproof type engine generator.
Figure 5:
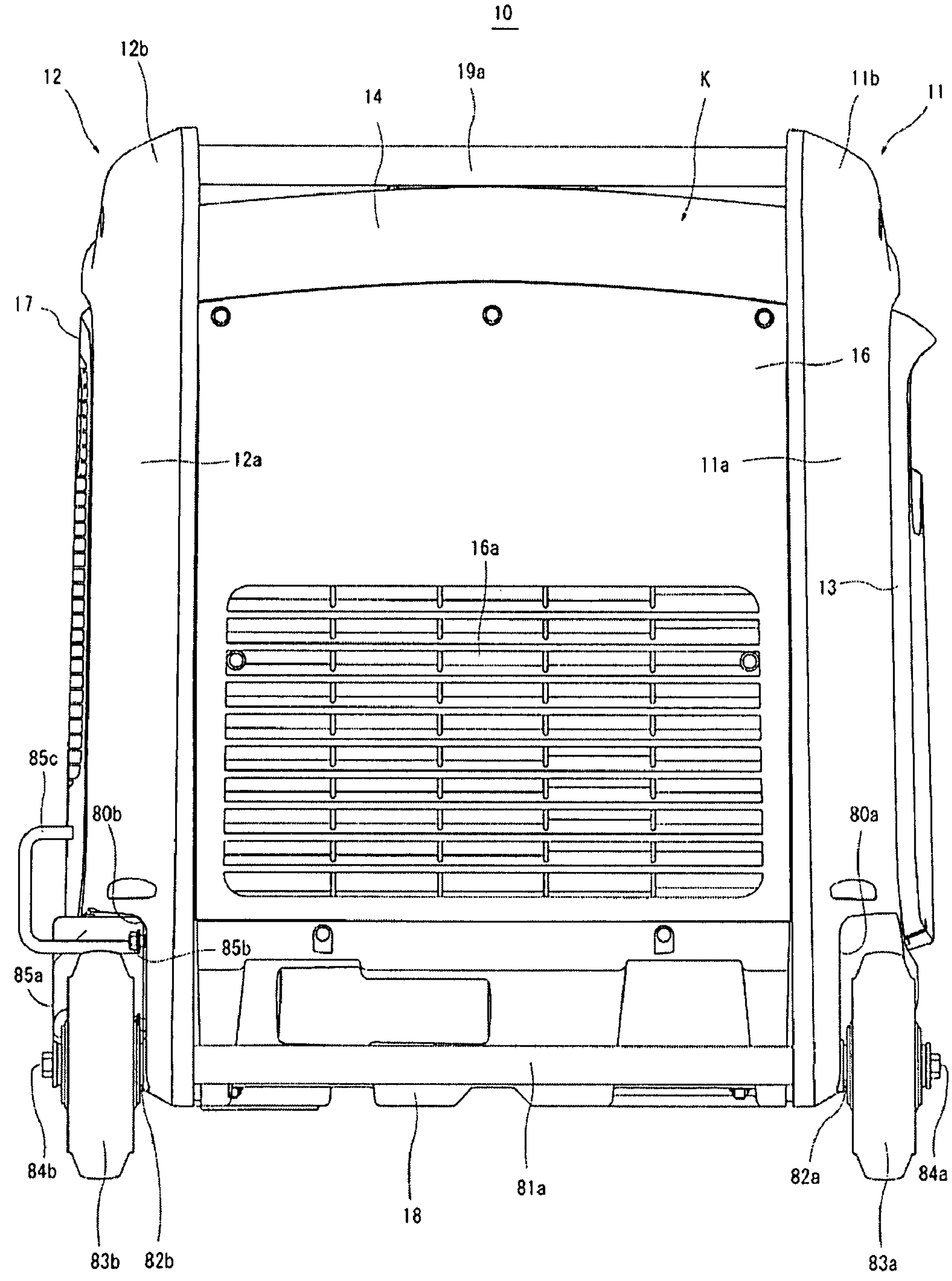
FIG. 5 is a schematic left side view of the soundproof type engine generator.
Figure 6:
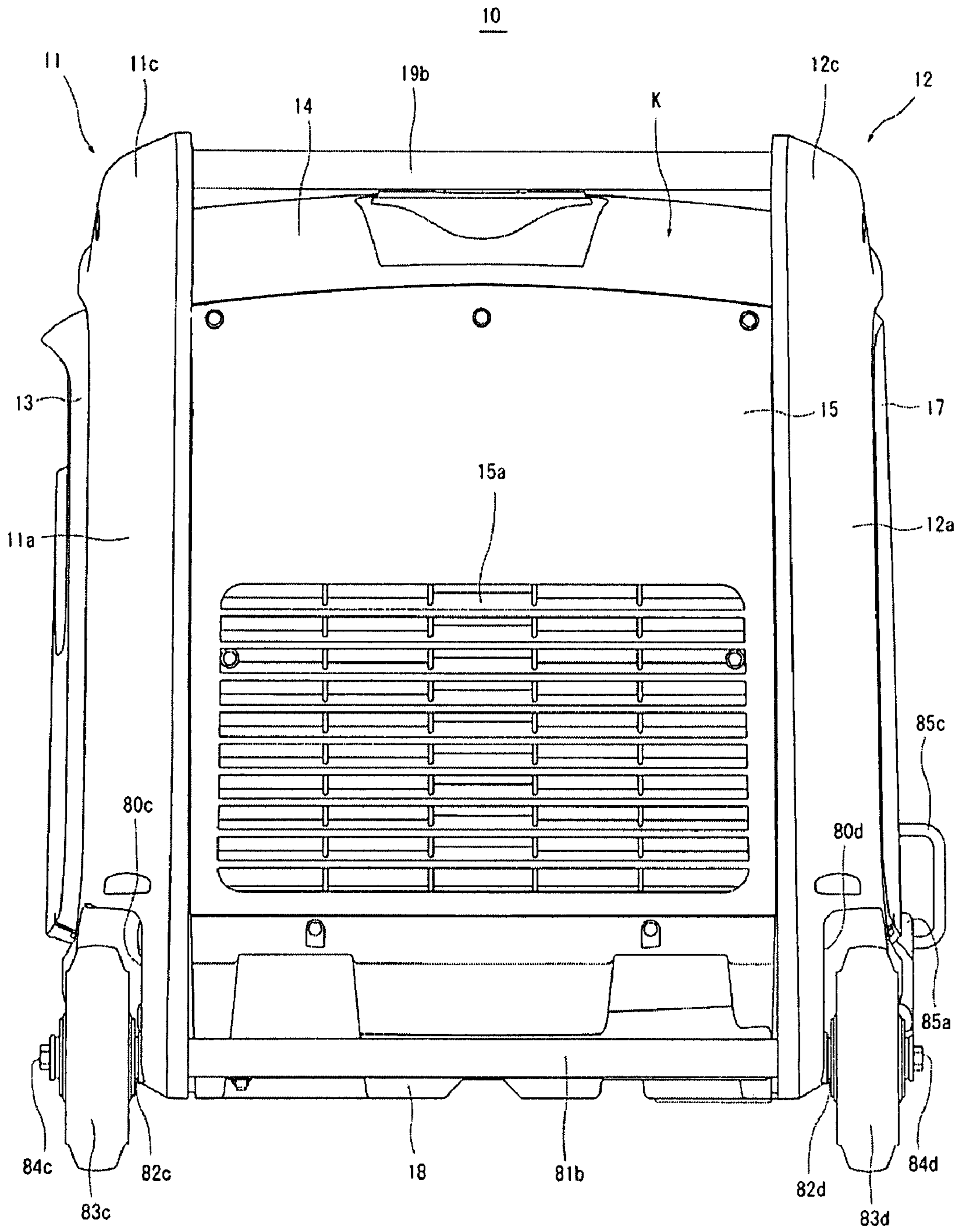
FIG. 6 is a schematic right side view of the soundproof type engine generator.
Figure 7:
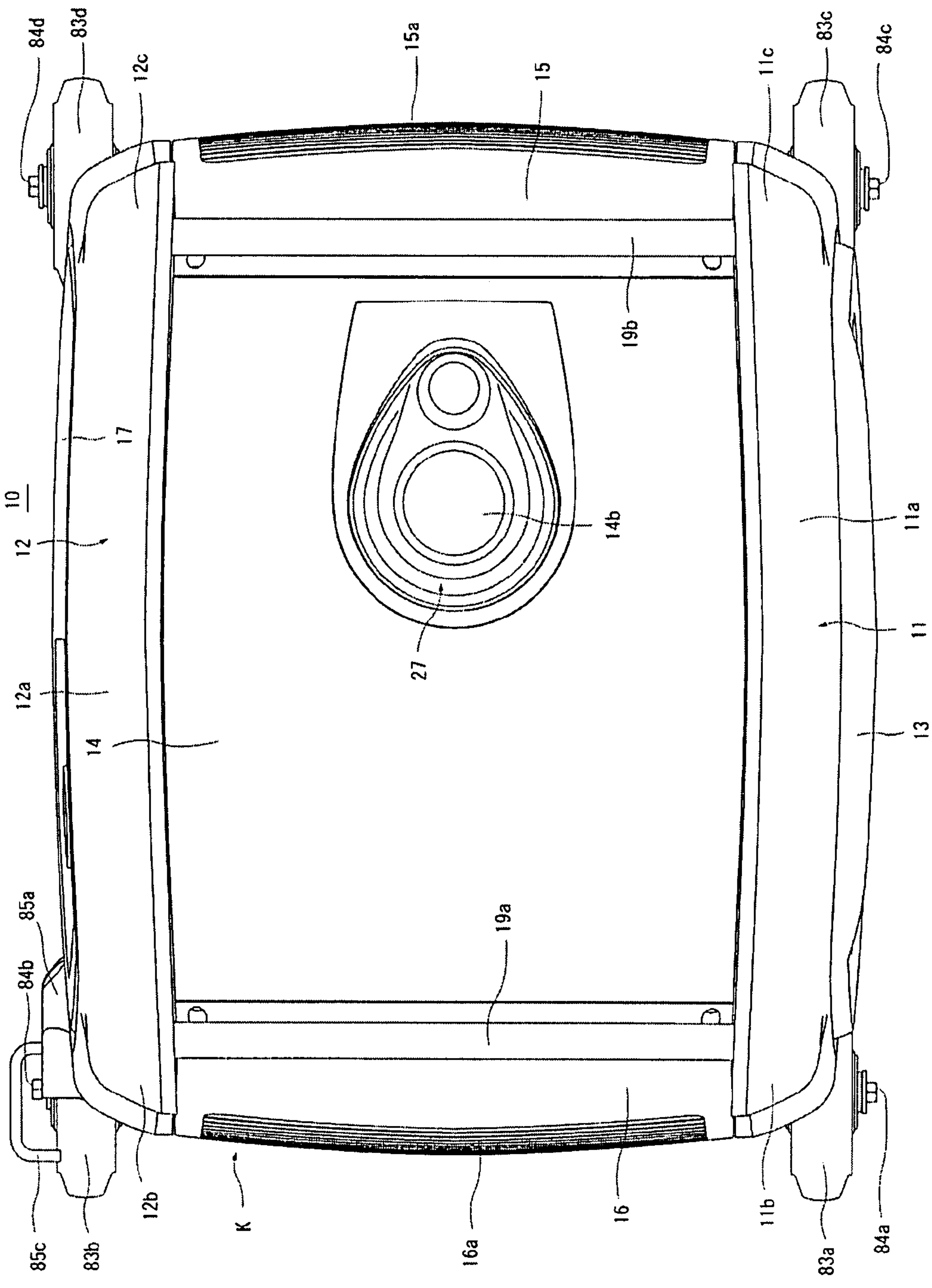
FIG. 7 is a schematic top plan view of the soundproof type engine generator.

As shown in FIGS. 3 and 4, the side ends of the wheels 83*a*, 83*b* are located farther in the advancing direction by a distance of L1 than the left side cover 16. Likewise, the side ends of the wheels 83*c*, 83*d* are located farther in the advancing direction by a distance of L2 than the right side cover 15. As a result, when the soundproof type engine generator 10 is placed near a wall or moved, the wheels 83*a*, 83*b* or the wheels 83*c*, 83*d* come into contact with the obstacle instead of the right side cover 15 or the left side cover 16.

Also, when the soundproof type engine generator 10 is to be lifted to a high position (e.g., to place it on a cart or a vehicle), it is possible to lift it to the elevated position by gripping the opposing pipe 81*a* and the pipe 81*b* below the soundproof type engine generator 10.

The front panel 13 is attached within the frame of the front cover 11 to constitute the front face of the soundproof type engine generator 10, and can be made as an integrally formed component of plastic material. The front panel 13 is formed with a recess 13*a* in which can be provided an electric outlet 13*b*, various switches 13*c*, etc.

The top cover 14 is attached between top end brims of the front frame 21A and the rear frame 22A to constitute the top face of the soundproof type engine generator 10, with its central part curving upward and extending right and left in a curved surface shape. In the approximate center of the top cover 14 is formed in a raised shape a fuel filler port passage part 14*a* for passing the fuel filler port 27*a* of a fuel tank 27. A fuel cap 14*b* is attached to the fuel filler port 27*a*.

The right side cover 15 and the left side cover 16 are attached to both side edges of the front frame 21A and the rear frame 22A to constitute respectively side faces of the soundproof type engine generator 10. A second external air inlet 15*a* that can be made up of a plurality of laterally extending slits, one above another, can be provided in part of the right side cover 15 from about its center to its lower part. Likewise, a first external air inlet 16*a* that can be made up of a plurality of laterally extending slits, one above another, is provided in part of the left side cover 16 from about its center to its lower part. An outlet 17*a* (e.g., or a round exhaust hole) can be formed in the upper part of the rear part of the rear panel 17. An outlet 17*b* made up of a plurality of laterally extending slit-shaped exhaust openings, one above another, can be formed in part of the rear panel 17 from about its center to its side.

The rear panel 17 is attached within the frame of the rear cover 12 to form the rear face of the soundproof type engine generator 10, and can be generally of the same shape as the front panel 13. The bottom cover 18 is attached between the lower end edges of the side frame 21A and the rear frame 22A to form the bottom face of the soundproof type engine generator 10.

Figure 8:
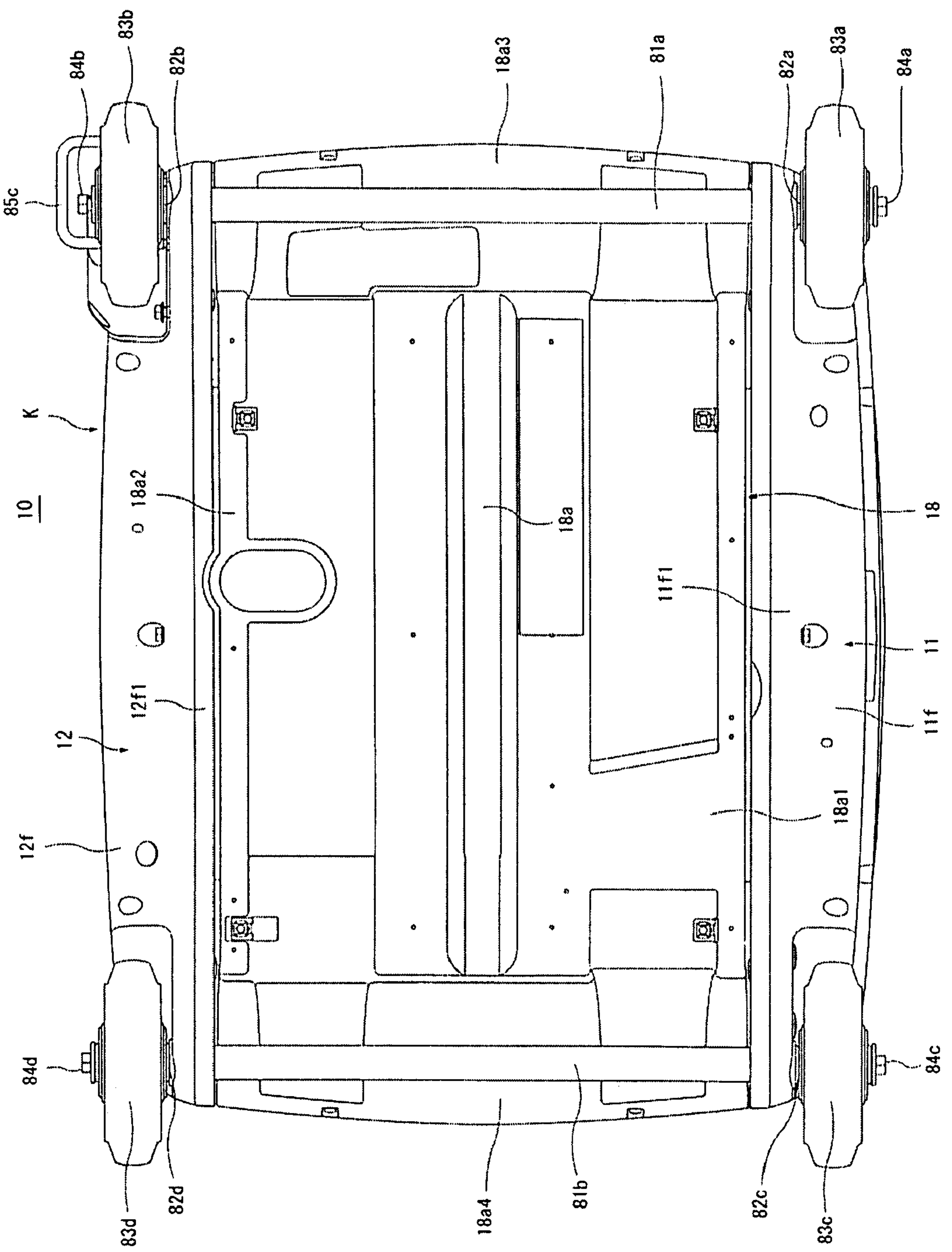
FIG. 8 is a schematic bottom view as seen from under the soundproof type engine generator.
Figure 10:
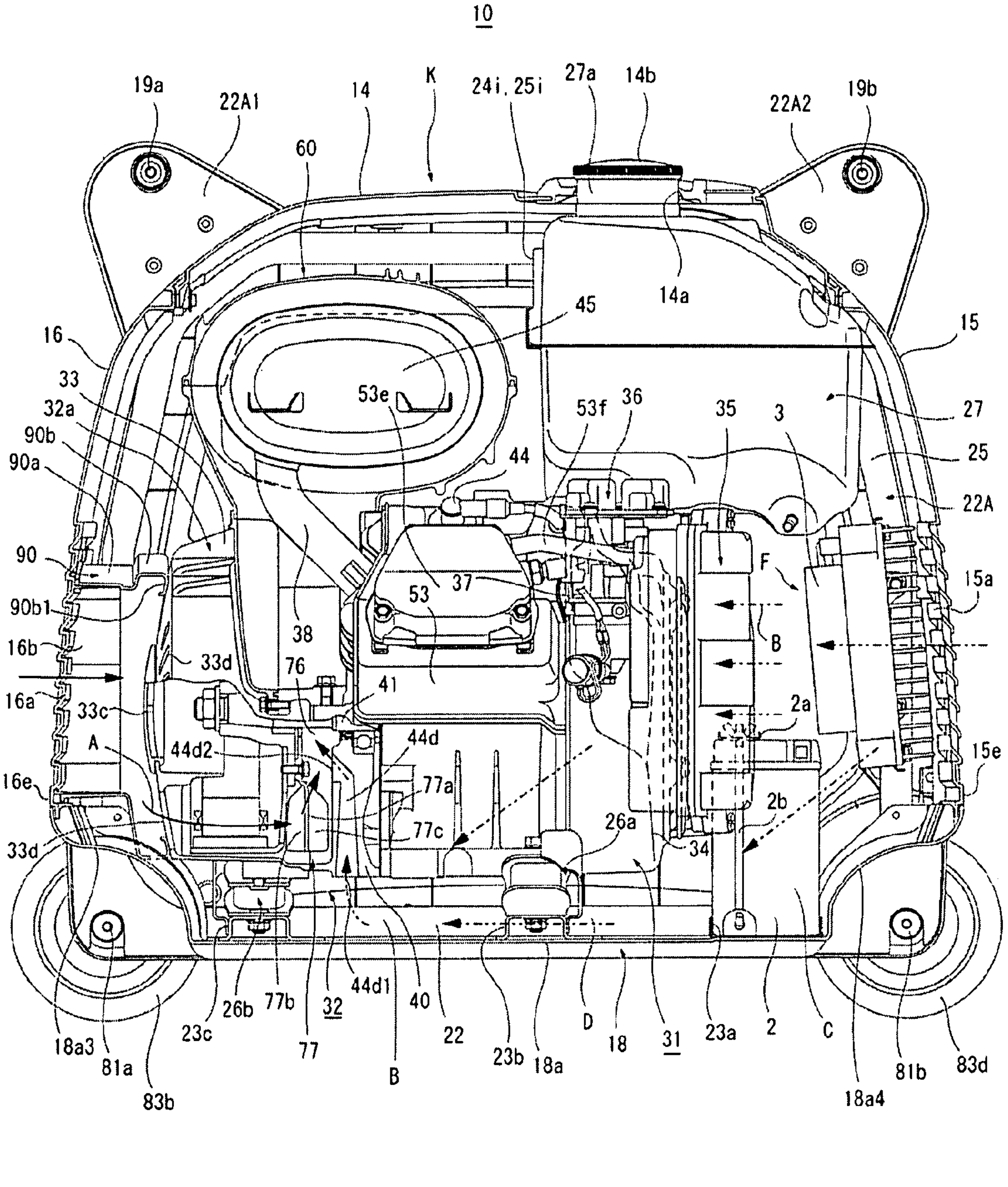
FIG. 10 is a schematic front elevation of the soundproof type engine generator in partial cross-section to show its interior.
Figure 12:
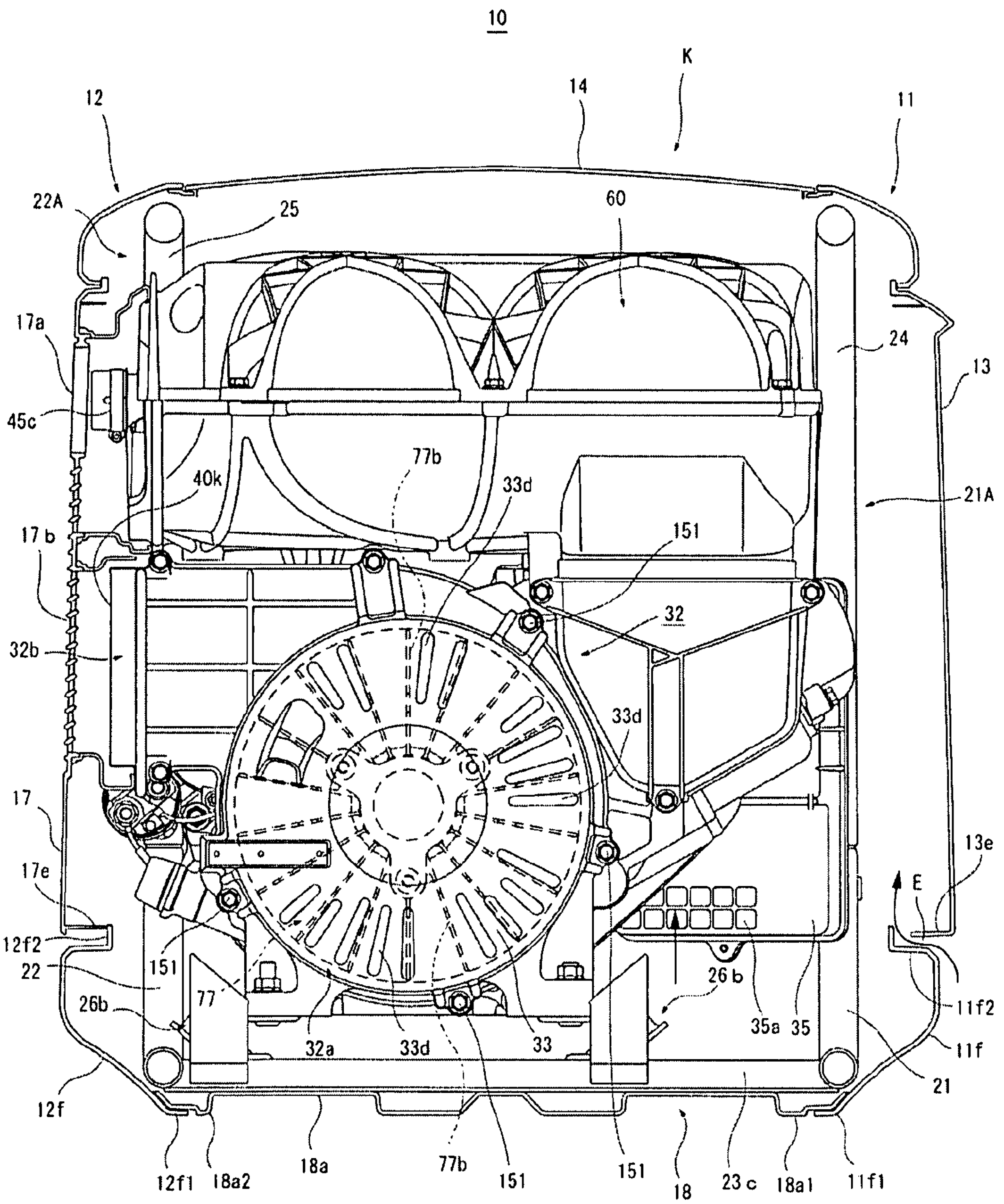
FIG. 12 is a schematic side view of the soundproof type engine generator, in partial cross-section to show its interior.
Figure 13:
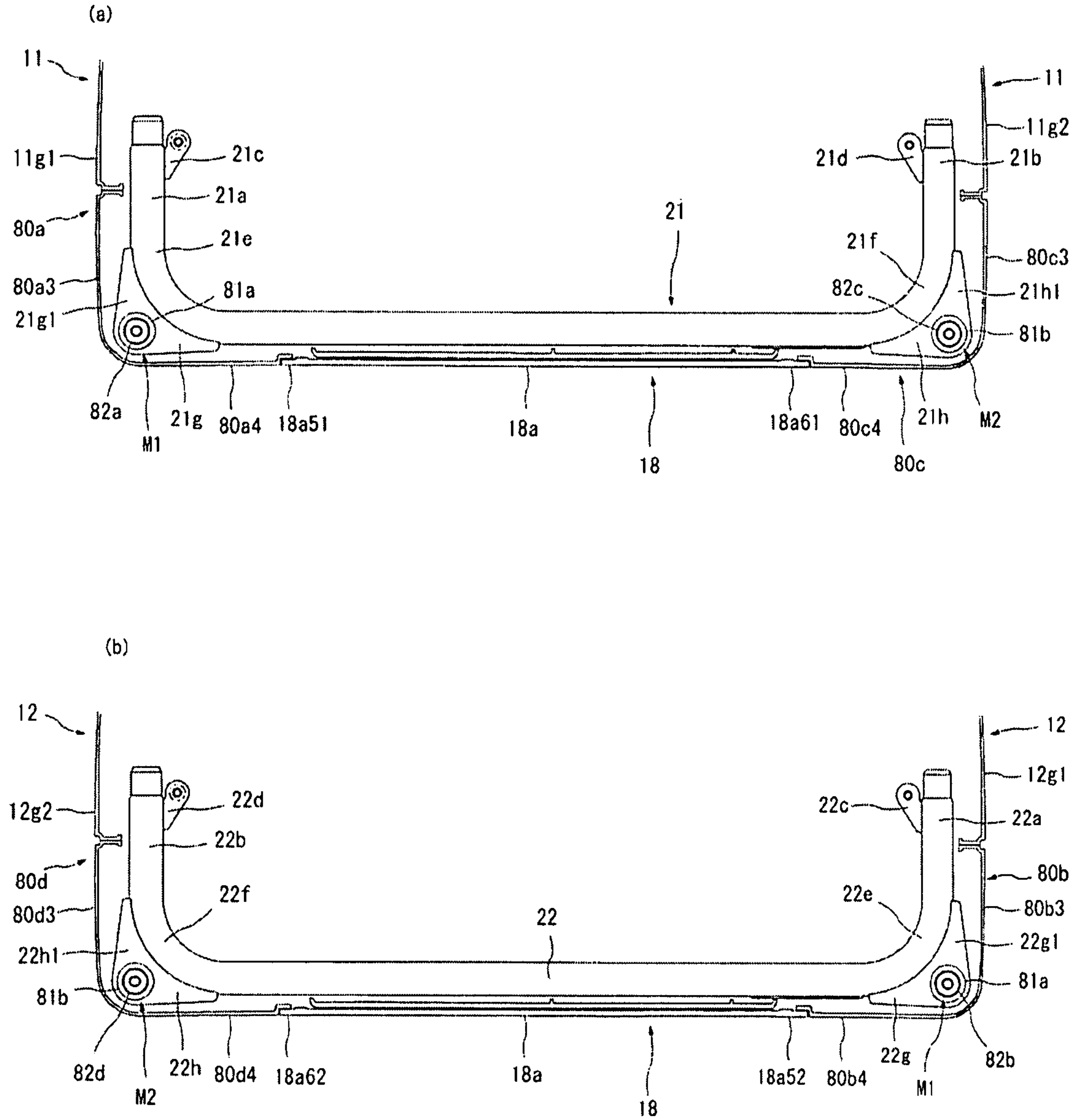
FIG. 13 shows schematic sections of wheel shaft area for attaching wheels, with FIG. 13(*a*) showing the schematic section as seen from the front, and with FIG. 13(*b*) showing the schematic section as seen from the rear.
Figure 14:
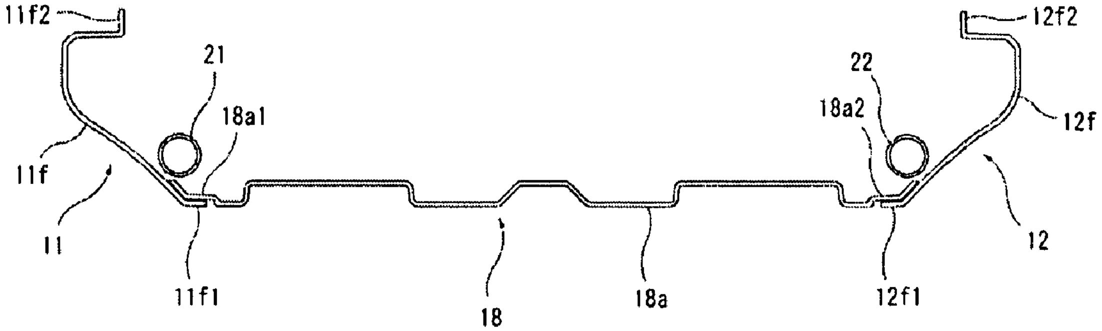
FIG. 14 shows a schematic section of a bottom cover.
Figure 15:
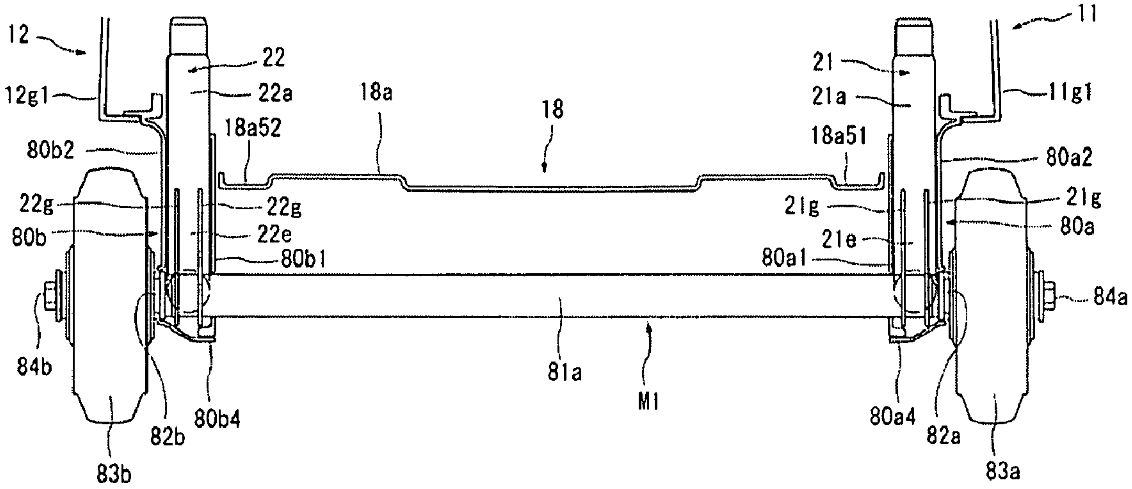
FIG. 15 shows schematic sections of wheel attachment area, with FIG. 15(*a*) showing a schematic section as seen from the left, and with FIG. 15(*b*) showing a schematic section as seen from the right.
Figure 15:
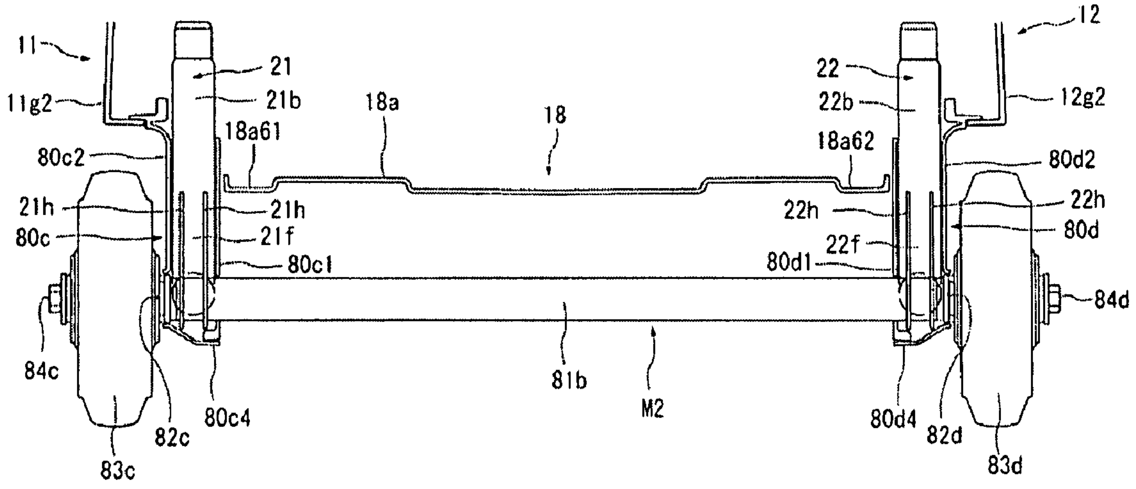
Figure 16:
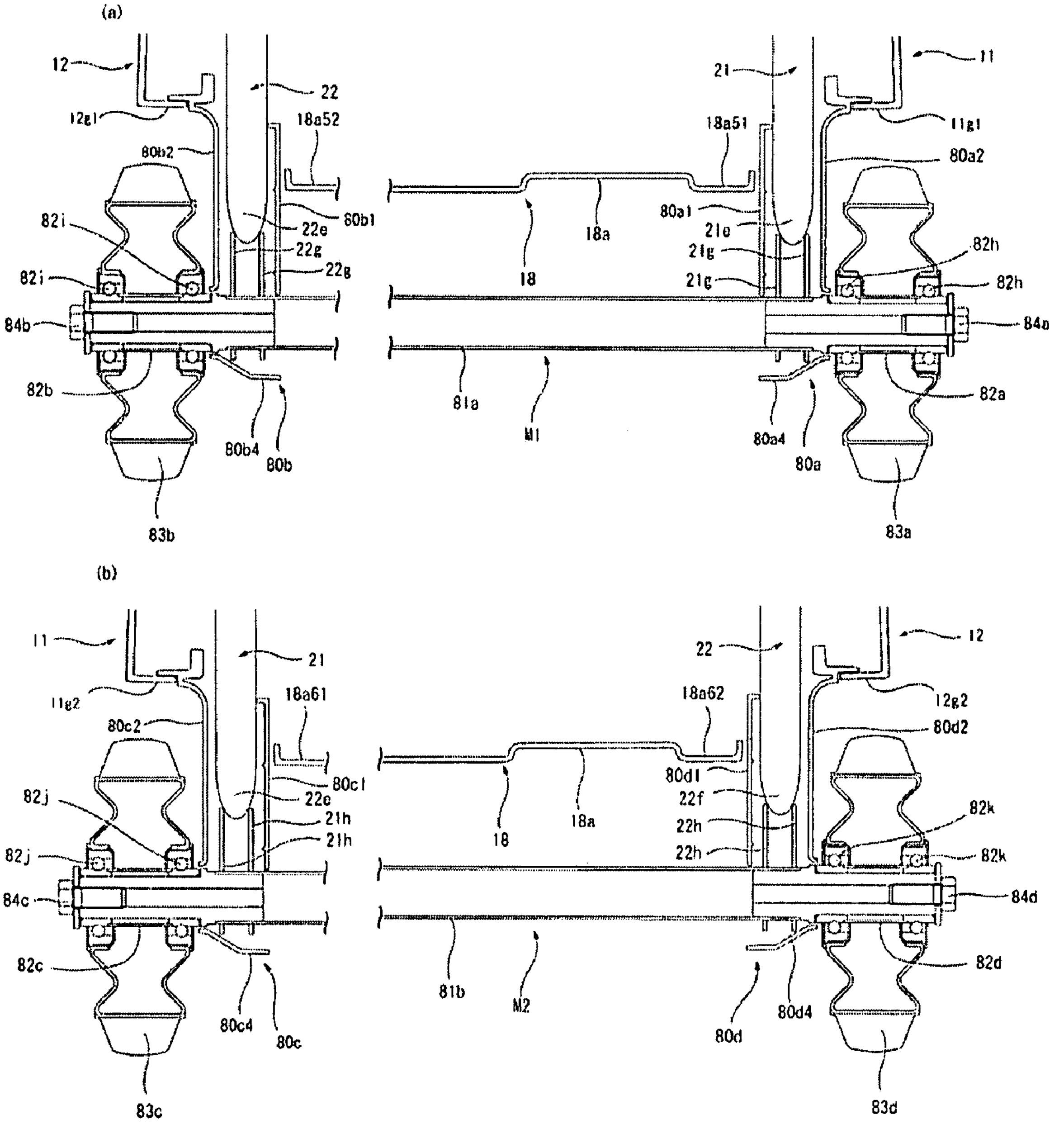
FIG. 16 shows schematic sections of the wheel area, with FIG. 16(*a*) showing a section as seen from the left, and with FIG. 16(*b*) showing a section as seen from the right.
Figure 17:
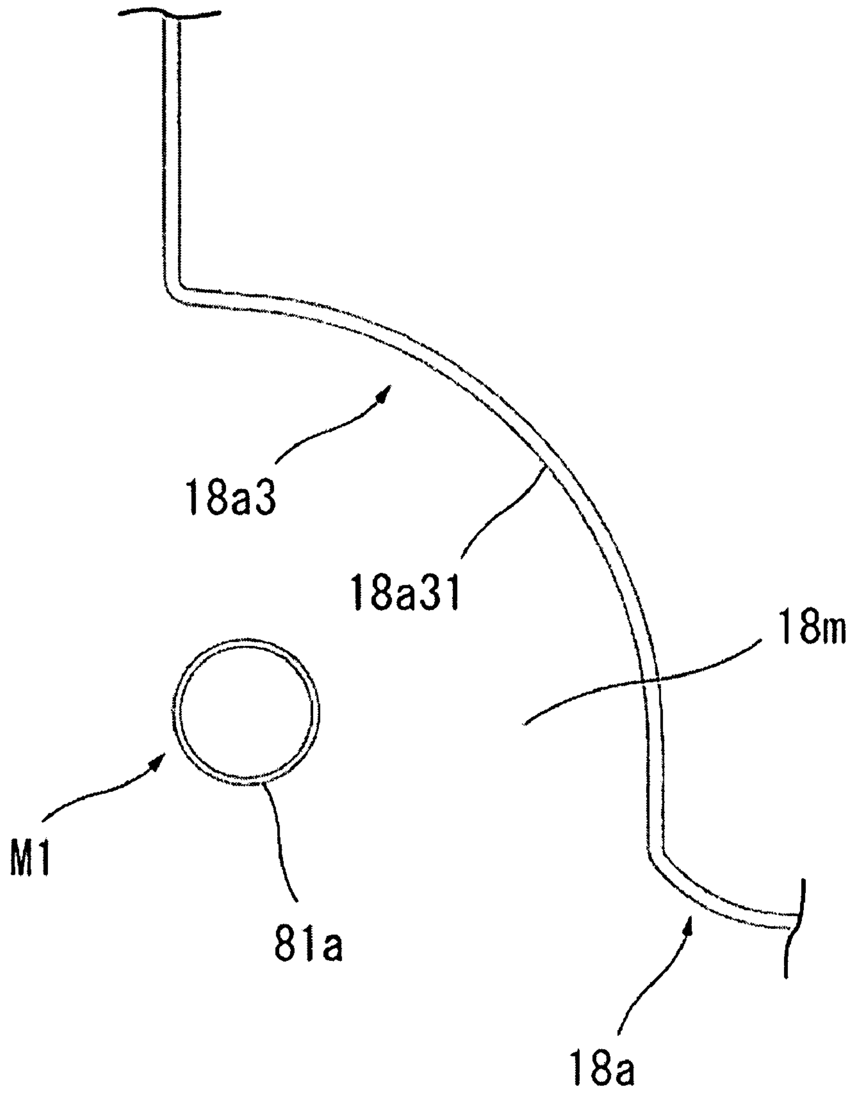
FIG. 17 shows a schematic section of the hold on the left hand.
Figure 18:
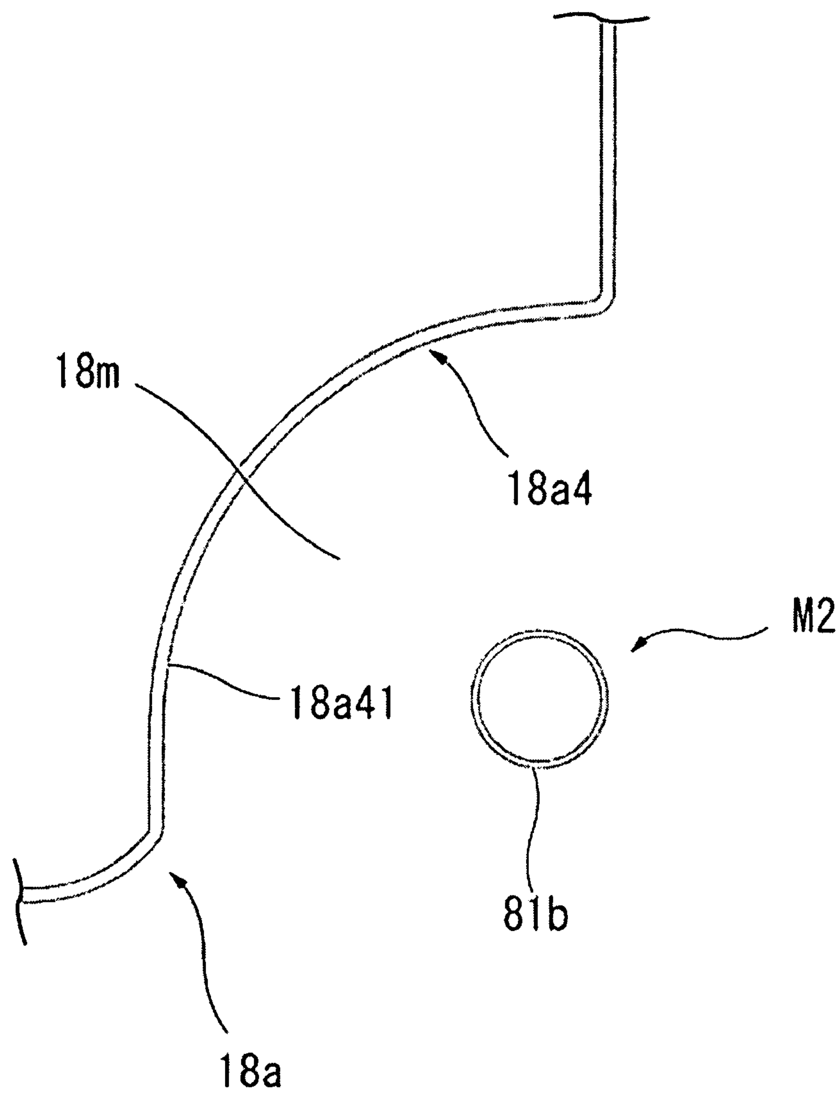
FIG. 18 shows a schematic section of the hold on the right hand.

As for the bottom cover 18, as shown in FIGS. 8, 10, and 12, the front end 18*a*1 of the bottom part 18*a* is placed over and joined to the lower end 11*f*1 of the front lower part 11*f* of the front cover 11. Likewise, the rear end 18*a*2 of the bottom part 18*a* is placed over and joined to the lower end 12*f*1 of the front lower part 12*f* of the front cover 12. As shown in FIG. 12, an air suction hole E can be formed in the part between the upper end 11*f*2 of the front lower part 11*f* of the front cover 11 and the lower end 13*e* of the front panel 13. The upper end 12*f*2 of the rear lower part 12*f* of the rear cover 12 and the lower end 17*e* of the rear panel 17 are joined together without a gap. The left end 18*a*3 of the bottom part 18*a* rises in an inward curve to form an arcuate recess, and can be placed on and joined to the lower end 16*a* of the left side cover 16 from outside as shown in FIG. 10. The right end 18*a*4 of the bottom part 18*a* rises in an inward curve to form an arcuate recess, and can be placed on and joined to the lower end 15*e* of the right side cover 15 from outside.

Inside the soundproof type engine generator 10 can be placed an engine 31 and a generator 32 side by side. The engine 31 can be supported through a pair of front and rear mounts 26*a* on the connecting frame 23*b*. The generator 32 can be supported through a pair of front and rear mounts 26*b* on the connecting frame 23*c*. In this way the generator 32 and the engine 31 are placed side by side in the soundproof case K.

A battery 2 can be placed behind the connecting frame 23*a* in the soundproof type engine generator 10. An attachment plate 2*a* can be put on the top part of the battery 2, and both ends of the attachment plate 2*a* can be secured to the connecting frame 23*a* using attachment members 2*b*. A fuel tank 27 can be placed above the engine 31 and attached to fuel tank attachment plates 24*i*, 25*i* of the front support frame 24 and the rear support frame 25. The fuel filler port 27*a* described before is provided in the central top part of the fuel tank 27. The fuel filler port 27*a* passes through the fuel filler port passage part 14*a* to project up beyond the top cover 14.

Figure 11:
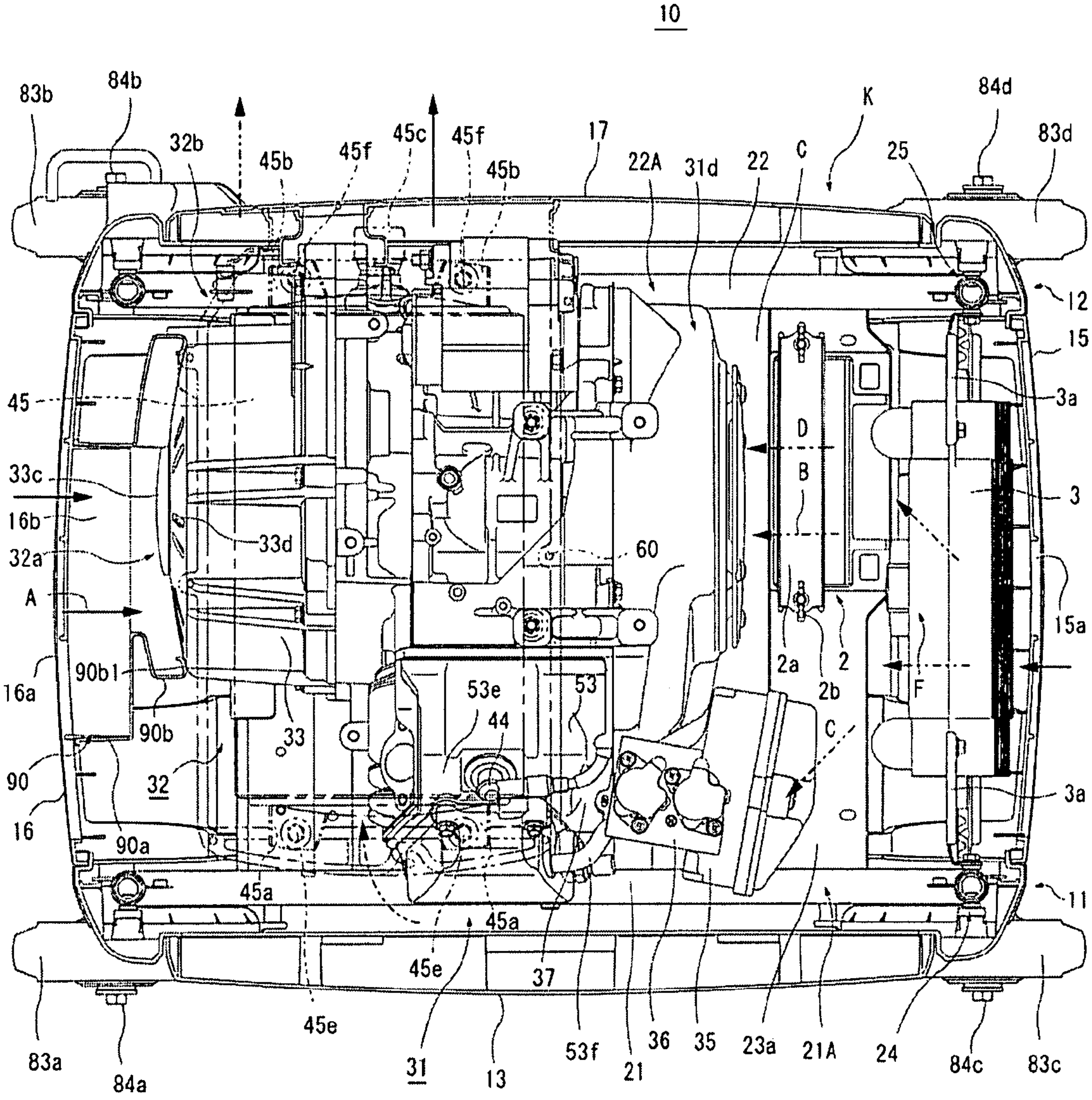
FIG. 11 is a schematic top plan view of the soundproof type engine generator, in partial cross-section to show its interior.

A controller 3 can be placed in a position facing the second external air inlet 15*a* in the vicinity of the right side cover 15 in the soundproof type engine generator 10. Both ends of the controller 3 can be attached to the front support frame 24 and the rear support frame 25 through brackets 3*a*. To the engine 31 can be attached a suction fan part 31*d* for aspirating air as shown in FIG. 11. The suction fan part 31*d* can be located on the controller 3 side.

An air cleaner 35 can be placed in about the vertical center of the front right side in the soundproof type engine generator 10 to suction air through the suction port 35*a* (see FIG. 12). A carburetor 36 can be placed beside the air cleaner 35 in a position nearer to the engine 31 than to the air cleaner 35. The air cleaner 35 can be placed on the suction side of the engine 31 to clean the air drawn in through the suction fan part 31*d* into the soundproof case K, and to send the cleaned air to the carburetor 36.

Fuel supplied from the fuel tank 27 to the carburetor 36 is mixed with air supplied to the carburetor 36 to make a mixture that is supplied through a suction pipe 37 to the engine 31. The engine 31 is provided with an ignition plug 44 to ignite and combust the mixture supplied from the carburetor 36. The combustion causes the engine 31 to operate. Blow-by gas filling the interior of the head gap 53*e* of the cylinder head 53 is returned through a blow-by gas pipe 53*f* to the air cleaner 35, mixed with air, and combusted again, so that blow-by gas is not released into the atmosphere.

A muffler 45 can be provided through an exhaust pipe 38 on the exhaust side of the engine 31. The exhaust pipe outlet 45*c* of the muffler 45 can face the outlet 17*a* of the rear panel 7. The muffler 45 can be attached through front and rear stays 45*a*, 45*b* using front and rear bolts 45*e*, 45*f* to the interior of the exhaust case 60.

Exhaust gas emitted from the engine 31 is sent through the exhaust pipe 38 to the muffler 45, silenced in there, and released outside. The exhaust case 60 can be positioned above the engine 31. External air suctioned with the suction fan part 31*d* cools the engine 31, flows through the exhaust case 60, and goes out through both the outlet 17*a* and the outlet 17*b* of the rear panel 17.

The generator 32 can be placed in the vicinity of the left side cover 16 in the soundproof type engine generator 10. The generator 32 is provided with an inlet part 32*a* and an outlet part 32*b*. A duct 90 is provided between the left side cover 16 and the suction part 32*a* of the generator 32 (see FIG. 12). The duct 90 can be made of rubber as a single part including a cover attachment part 90*a* and a generator attachment part 90*b*. The cover attachment part 90*a* can be attached by fitting it to a guide cylinder part 16*b* projecting inward and communicating with the first external air inlet 16*a* of the left side cover 16. The generator attachment part 90*b* can extend from the cover attachment part 90*a* toward the inlet part 32*a* of the generator 32 and can be formed in a shape that follows the external shape of a generator cover 33 constituting the inlet part 32*a*, with its fore-end 90*b*1 curved inward. The fore-end 90*b*1 can be pressed against and attached to the outer surface of the generator cover 33. The generator cover 33 can be formed with a plurality of introduction holes 33*d* radially about the axis thereof, so as to guide external air introduced through the first external air inlet 16*a* by the operation of the generator 32 through the duct 90 to the introduction holes 33*d* of the generator cover 33. The outlet part 32*b* of the generator 32 can be placed so as to face the outlet 17*b* of the rear panel 17 to guide the external air introduced from the first external air inlet 16*a* to the generator 32 through the duct 90 and, after passing it over the generator 32, to release it out of the soundproof case K through the exhaust part 32*b* of the outlet 17*b*.

The generator 32 is provided on the crankshaft 41 projecting from the crank case 40 of the engine 31 and extending toward the left side cover 16 to generate electricity by the rotation of the crankshaft 41. The opening of the generator cover 33 can be joined to the generator side opening of the crankcase 40 and secured by tightening bolts 151. After the generator 32 is attached to a rotary shaft 46, a cap 33*c* can be fit to the left cover 16 side of the generator cover 33.

A fan chamber 76 is formed between the generator side opening of the crankcase 40 and the opening of the generator cover 33. The first fan 77 is placed in the fan chamber 76. The first fan 77 can have a disk-like defining plane part 77*a*, and a plurality of first blades 77*b* and second blades 77*c* respectively provided radially on both sides of the defining plane part 77*a*. The defining plane part 77*a* of the first fan 77 can be secured to the flange part of the fixed shaft 49, so that the first fan 77 rotates with the rotary shaft 46. The crankcase 40 can be formed with air flow passages 40*d*. The inlet 40*d*1 of the air flow passages 40*d* and can open downward while its outlet 40*d*2 is open to the fan chamber 76.

The crankcase 40 is effectively cooled because at least part of the air flow passage is formed in the crankcase 40 and air flows through the air flow passage. The outlet part of the generator cover 33 of the generator 32 and the outlet part of the crankcase 40 can be joined together to form an outlet 40*k*, which can face the outlet 17*b* constituted with slit-like suction holes made in the rear panel 17.

The soundproof type engine generator 10 has a first cooling passage A and a second cooling passage B. The first cooling passage A guides external air introduced through the first external air inlet 16*a* of the left side cover 16 by the rotation of the first fan 77 through the duct 90 and the generator cover 33 to the first fan 77, to the generator 32, and out of the soundproof case K. The second cooling passage B guides external air introduced through the second external air inlet 15*a* of the right side cover 15 to the engine 31 with the second fan 34, and out of the soundproof case K. The flow of air through the first cooling passage A is indicated with the solid line, and the flow of air through the second cooling passage B is indicated with the dash-and-double-dotted line.

The first fan 77 has a disk-like defining plane part 77*a*, a plurality of first blades 77*b* and a plurality of second blades 77*c* respectively provided radially on head and tail sides of the defining plane part 77*a*. External air introduced through the first external air inlet 16*a* with the plurality of first blades 77*b* is guided through the duct 90 to the generator 32, and out of the soundproof case K. Air in the soundproof case K is sent out of the soundproof case K with the plurality of second blades 77*c*. The plural number of first blades 77*b*, the plurality of second blades 77*c*, and the disk-like defining plane part 77*a*, of the first fan 77 can be formed as a single member of plastic, so that the number of parts is reduced, thereby reducing the cost.

The first fan 77 is placed between the generator 32 and the engine 31. While the plurality of first blades 77*b* of the first fan 77 are placed so as to face the generator 32, the plurality of second blades 77*c* of the first fan 77 are placed so as to face the engine 31. The plurality of second blades 77*c* are placed between the engine 31 and the plurality of first blades 77*b* to introduce air in the soundproof case K through the air flow passage 40*d* to the plurality of second blades 77*c*.

The outlet 17*b* can be open at the rear panel 17 of the soundproof case K. Two air streams sent respectively with the first blades 77*b* and the second blades 77*c* of the first fan 77 are brought together in the outer radial vicinity of the first fan 77. Both the air streams in the state of being brought together are discharged through the outlet 17*b* out of the soundproof case K.

The first external air inlet 16*a* is provided on the generator side face in the crankshaft direction of the soundproof case K. The second external air inlet 15*a* is provided on the engine side face in the crankshaft direction of the soundproof case K. A space C in communication with the internal space of the soundproof case K is provided between the second external air inlet 15*a* and the second fan 34. Electric components F, such as the controller 3, the battery 2, etc. can be placed in the middle of an external air flow path D extending from the second external air inlet 15*a* to the suction fan part 31*d* in the space C. As for the crankcase 40, an air flow passage 40*d* is formed in a lower position. An air inlet 40*d*1 for introducing air into the air flow passage is formed in the bottom part of the engine 31. The air inlet 40*d*1 is provided in the vicinity of the second blades 77*c* of the first fan 77.

The soundproof type engine generator 10 has a first cooling passage A and a second cooling passage B. The first cooling passage A guides external air introduced through the first external air inlet 16*a* to the first fan 77, to the generator 32, and out of the soundproof case K. The second cooling passage B guides external air introduced through the second external air inlet 15*a* to the engine 31 with the second fan 34, and out of the soundproof case K. Therefore, external air can be introduced separately to the generator 32 and the engine 31, so that the generator is cooled effectively. In other words, the first fan 77 rotates along with the operation of the soundproof type engine generator 10. The first fan 77 has the plurality of first blades 77*b* and second blades 77*c*. External air introduced through the first external air inlet 16*a* is guided with the plural number of first blades 77*b* through the first cooling passage A to the generator 31, and released out of the soundproof case K. At the same time, as the air in the soundproof case K is drawn out of the soundproof case K with the second blades 77*c* for drawing out the warmed-up air in the soundproof case K, the interior of the soundproof case K is effectively cooled. Further, as the first fan 77*b* for cooling the generator 32 and the second fan 77*c* for discharging air in the soundproof case K are respectively formed on head and tail sides of the disk-like defining plane part 77*a*, the constitution of the air flow passage via the layout and attachment constitution of the fan is simplified in comparison with the case in which the fans are provided separately.

The outlet 17*b* can be made open at the soundproof case K. Two air streams sent respectively with the first blades 77*b* and the second blades 77*c* of the first fan 77 are brought together in the outer radial vicinity of the first fan 77. The combined air streams can be discharged through the outlet 17*b*. Therefore, in comparison with the case in which respective air streams are sent with the first blades 77*b* and the second blades 77*c*, and discharged through separate paths, air is discharged faster and farther. At the same time, the exhaust discharge is simplified.

The first external air inlet 16*a* is provided on the generator side face in the crankshaft direction of the soundproof case K. The second external air inlet 15*a* is provided on the engine side face in the crankshaft direction of the soundproof case K. A space C in communication with the internal space of the soundproof case K is provided between the second external air inlet 15*a* and the second fan 34. Electric components F, such as the controller 3, the battery 2, etc. can be placed in the middle of an external air flow path D extending from the second external air inlet 15*a* to the second fan 34 of the suction fan part 31*d* in the space C. Air inlets 40*d*1, 40*f*1 for introducing air in the soundproof case K into the air flow passages 40*d*, 40*f* are formed in the vicinity of upper and lower parts of the crank chamber 86 of the engine 31. Air is suctioned through the air inlets 40*d*1, 40*f*1 near the second blades 77*c*. Part of the external air introduced through the second external air inlet 15*a* is suctioned through the air inlets 40*d*1, 40*f*1. Therefore, the electric components F such as the controller 3, the battery 2, etc. are effectively cooled with the air flowing through the external air flow path D.

While the soundproof type engine generator 10 is in operation, external air is suctioned into the soundproof type engine generator 10 through the suction holes E by the operation of the suction fan part 31*d*. The suctioned external air flows as cooling air to the external air flow path D to cool the engine 31. As the air inlet 40*d*1 is provided in the vicinity of the second blades 77*c*, part of the external air introduced through the second external air inlet 15*a* is suctioned through the air inlet 40*d*1 and external air introduced through the second external air inlet 15*a* flows from the engine body along the surface of the crankcase 40 over a wide area of the crankcase 40. Therefore, the crankcase 40 is effectively cooled.

Next, FIGS. 13 to 18 shows the structure of one embodiment of a wheel attachment.

The soundproof type engine generator 10 can be provided with four wheels for transport in the lower part of an outer shell of the soundproof case K. Two pairs of wheel shaft attachment brackets 21*g*, 22*g* and 21*h*, 22*h* can be attached to outer sides of bent parts 21*e*, 22*e* and 21*f*, 22*f* of the front lower frame 21 and the rear lower frame 22 by weld-securing their attachment portions 21*g*1, 22*g*1 and 21*h*1, 22*h*1. The wheel shaft attachment brackets 21*g*, 22*g* and 21*h*, 22*h* can be respectively made of triangular metallic plates. The outward sides of the wheel shaft attachment brackets 21*g*, 22*g* respectively project farther outward than the bent parts 21*e*, 22*e*. Likewise, the outward sides of the wheel shaft attachment brackets 21*h*, 22*h* can respectively project farther outward than the bent parts 21*f*, 22*f*.

Wheel shafts 82*a*, 82*b* can be weld-secured to both ends of an iron pipe 81*a*. Parts of both ends of the pipe 81*a* can be weld-secured to the wheel shaft attachment brackets 21*g*, 22*g*. Likewise, wheel shafts 82*c*, 82*d* are weld-secured to both ends of an iron pipe 81*b*. Parts of both ends of the pipe 81*b* can be weld-secured to the wheel shaft attachment brackets 21*h*, 22*h*. In this way, a handle M1 to be held by hand can be provided coaxially with the wheel shafts 82*a*, 82*b* of the wheels 83*a*, 83*b*. The handle M1 can be defined by the pipe 81*a*. The pipe 81*a* can be a hollow metallic pipe. The wheel shafts 82*a*, 82*b* can be press-fitted into and weld-secured to right and left ends of the pipe 81*a*. Likewise, a handle M2 to be held by hand can be provided coaxially with the wheel shafts 82*c*, 82*d* of the wheels 83*c*, 83*d*. The handle M2 can be defined by the pipe 81*b*. The pipe 81*a* can be a hollow metallic pipe. The wheel shafts 82*c*, 82*d* can be press-fitted into and weld-secured to right and left ends of the pipe 81*b*. The pipes 81*a*, 81*b* which can be the handles M1, M2, may be made of reinforced plastic or the like. However, other suitable materials can be used.

Both ends of the pipe 81*a* can be passed through the wheel shaft attachment brackets 21*g*, 22*g*, and weld-secured. The wheels 83*a*, 83*b* are rotatable through bearings 82*h*, 82*i* on the wheel shafts 82*a*, 82*b* secured to both ends of the pipe 81*a*. The pair of wheel shaft attachment brackets 21*g* can be entirely covered with a body inside part 80*a*1, a body front part 80*a*2, a body advancing side part 80*a*3, and body under part 80*a*4 of the wheel cover 80*a*, to inhibit from being soiled by water and mud. The body inside part 80*a*1 is inserted to the front left wheel side end 18*a*51 of the bottom cover 18. The body front part 80*a*2 is connected to the front left wheel side end 11*g*1 of the front cover 11. The body advancing side part 80*a*3 is connected to the front left wheel side end 11*g*1 of the front cover 11. The body under part 80*a*4 is connected to the front left side end 18*a*51 of the bottom cover 18. The pair of wheel shaft attachment brackets 22*g* can be entirely covered with a body inside part 80*b*1, a body front part 80*b*2, a body advancing side part 80*b*3, and body under part 80*b*4 of the wheel cover 80*b*, to inhibit being soiled by water and mud. The body inside part 80*b*1 is inserted to the rear left wheel side end 18*a*52 of the bottom cover 18. The body rear part 80*b*2 is connected to the rear left wheel side end 12*g*1 of the rear cover 12. The body advancing side part 80*b*3 is connected to the rear left wheel side end 12*g*1 of the rear cover 12. The body under part 80*b*4 is connected to the rear left side end 18*a*52 of the bottom cover 18.

Both ends of the pipe 81*b* can be passed through the wheel shaft attachment brackets 21*h*, 22*h*, and weld-secured. The wheels 83*c*, 83*d* are rotatable through bearings 82*j*, 82*k* on the wheel shafts 82*c*, 82*d* secured to both ends of the pipe 81*b*. The pair of wheel shaft attachment brackets 21*h* can be entirely covered with a body inside part 80*c*1, a body front part 80*c*2, a body advancing side part 80*c*3, and body under part 80*c*4 of the wheel cover 80*c*, to inhibit being soiled by water and mud. The body inside part 80*c*1 is inserted to the front right wheel side end 18*a*61 of the bottom cover 18. The body front part 80*c*2 is connected to the front right wheel side end 11*g*2 of the front cover 11. The body advancing side part 80*c*3 is connected to the front right wheel side end 11*g*2 of the front cover 11. The body under part 80*c*4 is connected to the front right side end 18*a*61 of the bottom cover 18. The pair of wheel shaft attachment brackets 22*h* can be entirely covered with a body inside part 80*d*1, a body front part 80*d*2, a body advancing side part 80*d*3, and body under part 80*d*4 of the wheel cover 80*d*, to inhibit being soiled by water and mud. The body inside part 80*d*1 is inserted to the rear right wheel side end 18*a*62 of the bottom cover 18. The body rear part 80*d*2 is connected to the rear left wheel side end 12*g*2 of the rear cover 12. The body advancing side part 80*d*3 is connected to the rear left wheel side end 12*g*2 of the rear cover 12. The body under part 80*d*4 is connected to the rear left side end 18*a*62 of the bottom cover 18.

The left side end 18*a*3 of the bottom part 18*a* of the bottom cover 18 rises in an inward curve to make an arcuate recess, and can be placed on and joined to the lower end 16*e* of the left side cover 16 from outside. A roomy space 18*m* is formed between the recess 18*a*31 of the left end 18*a*3 and the pipe 81*a* serving as the handle M1, so that a worker may grip the handle M1 by hand without hindrance. The right side end 18*a*4 of the bottom part 18*a* rises in an inward curve to make an arcuate recess, and can be placed on and joined to the lower end 15*e* of the right side cover 15 from outside. A roomy space 18*n* is formed between the recess 18*a*41 of the right end 18*a*4 and the pipe 81*b* serving as the handle M2, so that a worker may grip the handle M2 by hand without hindrance.

Because the handles M1, M2 of the soundproof type engine generator 10 can be the pipes 81*a*, 81*b*, they are easy to grip. Therefore, even if the soundproof type engine generator 10 is heavy, it is easy to move the generator from a low to an elevated position (e. g., by two persons on both sides of the generator, each person gripping the handles M1, M2 with a single hand or with both hands. Further, the handle M1 made of the pipe 81*a* to be held by hand is provided coaxially with the wheel shafts 82*a*, 82*b* of the wheels 83*a*, 83*b*, and the handle M2 made of the pipe 81*b* is provided coaxially with the wheel shafts 82*c*, 82*d* of the wheels 83*c*, 83*d*. In other words, the handles M1, M2 are provided coaxially with the wheel shafts while utilizing the wheel shafts of the wheels without additional parts. Therefore, it is possible to reduce cost and weight.

Further details on a soundproof type engine generator are provided in U.S. application Ser. No. 11/775,825, filed Jul. 10, 2007, the entire contents of which are hereby incorporated by reference and should be considered a part of this specification.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. For example, though certain materials have been identified in the preferred embodiments disclosed above, one of ordinary skill in the art will recognize that other suitable materials can also be used. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. An engine generator comprising:

an outer shell including a bottom panel attached to a three-dimensional frame;

four wheels arranged in a lower portion of the outer shell to allow transport of the engine generator;

a first handle substantially coaxial with a rotating axis of two of the four wheels, the first handle arranged to extend between the two of the four wheels; and a second handle substantially coaxial with a rotating axis of another two of the four wheels, the second handle arranged to extend between the another two of the four wheels; wherein the first and second handles are arranged in the lower portion of the outer shell so as to be gripped by hand.

2. The engine generator of claim 1, wherein at least a portion of at least one of the first and second handles is disposed in a recessed portion of the outer shell to provide a space so that the at least one of the first and second handles can be gripped by hand without hindrance.

3. The engine generator of claim 2, wherein the recessed portion has an arcuate shape.

4. The engine generator of claim 1, wherein the two of the four wheels are disposed farther outward along a longitudinal axis of the engine generator than the outer shell so as to inhibit damage to the engine generator due to contact with an object during transport of the engine generator.

5. The engine generator of claim 4, wherein the another two of the four wheels are disposed farther outward along the longitudinal axis of the engine generator than the outer shell so as to inhibit damage to the engine generator due to contact with an object during transport of the engine generator.

6. An engine generator comprising:

an outer shell including a lower portion;

first and second sets of wheels provided on the lower portion of the outer shell and arranged to allow transport of the engine generator, the first set of wheels including a first wheel shaft and the second set of wheels including a second wheel shaft;

a first handle substantially coaxial with the first wheel shaft and arranged to extend between the first set of wheels; and a second handle substantially coaxial with the second wheel shaft and arranged to extend between the second set of wheels; wherein the first and second handles are arranged in the lower portion of the outer shell so as to be gripped by hand.

7. The engine generator of claim 6, wherein at least a portion of each wheel in the first and second sets of wheels is disposed in a recessed portion of the outer shell.

8. The engine generator of claim 7, wherein the recessed portion has an arcuate shape.

9. The engine generator of claim 6, wherein the first set of wheels is disposed farther outward along a longitudinal axis of the engine generator than the outer shell so as to inhibit damage to the engine generator due to contact with an object during transport of the engine generator.

10. The engine generator of claim 9, wherein the second set of wheels is disposed farther outward along the longitudinal axis of the engine generator than the outer shell so as to inhibit damage to the engine generator due to contact with an object during transport of the engine generator.

11. The engine generator of claim 6, wherein the first wheel shaft includes a wheel shaft for each wheel in the first set of wheels, and the second wheel shaft includes a wheel shaft for each wheel in the second set of wheels.

12. The engine generator of claim 6, wherein an advancing direction end of each wheel in the first and second sets of wheels is in a more advanced position than an advancing direction end of the outer shell.

* * * * *